United States Patent [19]

Ozawa et al.

[11] Patent Number: 5,712,756
[45] Date of Patent: Jan. 27, 1998

[54] SUBSTATION WITH SURGE ARRESTERS

[75] Inventors: Jun Ozawa, Hitachi; Kazuya Ooishi, Tokai-mura; Katsuji Shindo, Hitachi; Takahide Matsuo, Hitachi; Yoshitaka Yagihashi, Hitachi; Takeo Yamazaki, Hitachi, all of Japan

[73] Assignee: Hitachi, Ltd., Tokyo, Japan

[21] Appl. No.: 610,189

[22] Filed: Mar. 4, 1996

[30] Foreign Application Priority Data

Mar. 8, 1995 [JP] Japan .................................. 7-048092

[51] Int. Cl.$^6$ .................................................. H02H 1/04
[52] U.S. Cl. ............................ 361/127; 361/120; 361/62; 338/21
[58] Field of Search ......................... 361/120, 117–127, 361/62; 338/20, 21

[56] References Cited

U.S. PATENT DOCUMENTS 4,450,426  5/1984  Miyoshi et al. ............................ 338/21
4,681,717  7/1987  Brooks et al. ............................ 264/61
4,729,053  3/1988  Maier et al. ............................ 361/118
4,943,795  7/1990  Yamazaki et al. ........................ 338/21

OTHER PUBLICATIONS

T. Ono et al, "Estimation of Overvoltage Suppression Effect of an Open End Arrester and Suppression of Lightning Surge with a Light–duty Arrester", Journal Of Electric Engineering Society Of Japan, vol. 112, No. 3, 1992, pp. 259–266.

*Primary Examiner*—Howard L. Williams
*Assistant Examiner*—Michael J. Sherry
*Attorney, Agent, or Firm*—Fay, Sharpe, Beall, Fagan, Minnich & McKee

[57] ABSTRACT

A substation includes standard arresters installed near a bushing of a power transmission line entrance and at a connecting bus of a transformer and one or more high voltage arresters having a discharge voltage 10 to 30% higher than a standard arrester. Each high voltage arrester uses zinc oxide elements and is disposed on a line side of a line entrance breaker and/or near an open end of a double main bus in the substation.

7 Claims, 2 Drawing Sheets

SUBSTATION WITH SURGE ARRESTERS

DETAILED DESCRIPTION OF THE INVENTION

1. Field of the Invention

This invention relates to a substation composed of a gas insulated switchgear (GIS) using a zinc oxide type of arrester.

2. Description of the Prior Art

There is disclosed a conventional gas insulated switchgear in "Estimation of Overvoltage Suppression Effect of an Open End Arrester and Suppression of Lightning Surge with a Light-duty Arrester" of "Journal of Electric Engineering Society of Japan", Volume 112, No. 3, p259–266(1992). This apparatus as shown in FIG. 6, comprises standard arrester A that satisfies the standard, light duty arrester B of the discharge voltage that is 10 to 20% higher than that of standard arrester A and means for suppressing overvoltage V. In the above prior art, zinc oxide elements of the same material and the same composition are used for standard arrester A and light duty arrester B, and arrester B is formed equally long or is longer than arrester A. Therefore, it is hard to install the arrester in the gas insulated switchgear. As the discharge voltage of arrester B becomes high, or as the diameter of the zinc oxide elements becomes small, the whole series capacitance become smaller. Thus, there is a problem that equalization of voltage share on each zinc oxide element is difficult.

SUMMARY OF THE INVENTION

This invention is based on the above consideration, and an object of the present invention is to provide a substation with a well balanced insulation coordination and high reliability wherein arrester B is made smaller than arrester A, the former being installed near the open end of the gas insulated switchgear (herein after referred to as GIS). The above object is achieved by applying zinc oxide elements of a new composition to arrester B, the elements being able to be used in a higher electric field of 1.5 times or more than that of the conventional apparatus. By providing the above means, the length of arrester B can be made shorter than that of arrester A, thus arrester B is easy to be install in to the GIS and it is easy to equalize voltage share of each of zinc oxide elements of arrester B.

DETAILED DESCRIPTION OF PREFERRED EMBODIMENTS

Examples of this invention will be concretely explained in the following by reference to the drawings.

EXAMPLE 1

Figure 1:
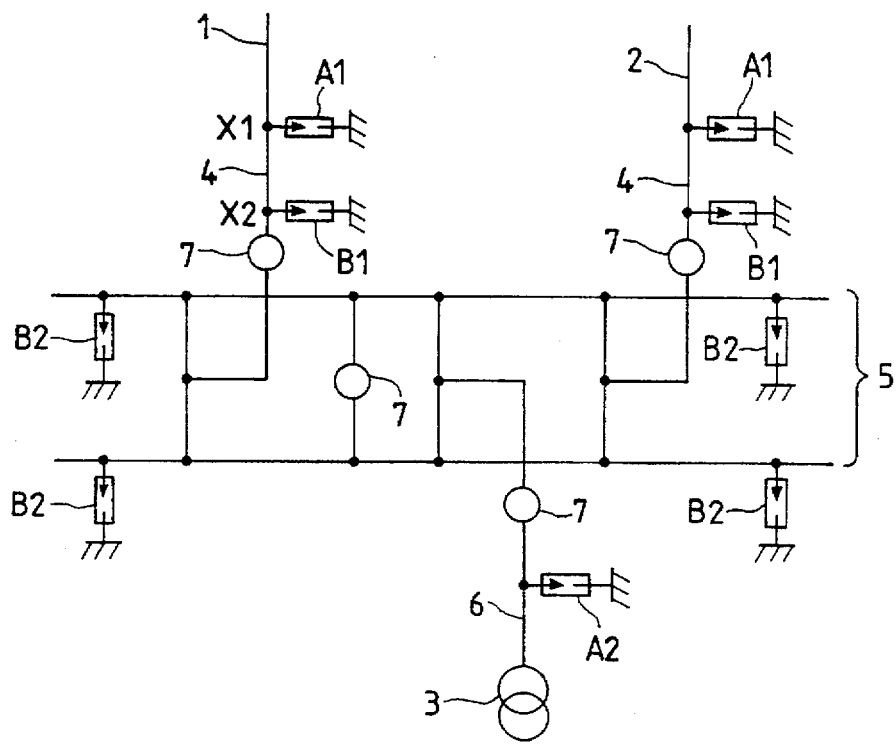
FIG. 1 shows a single-line connection circuit in a substation using a GIS apparatus of the present invention.

FIG. 1 is an example of the present invention showing a schematic of a single-line connection circuit of a substation using a GIS. The substation is composed of two power transmission lines 1, 2, transformer 3 of one bank, line entrance 4 using the GIS, double main bus 5 and transformer connecting bus 6. In the substation of this example, a line entrance 4 and a breaker 7 are connected to each of the power transmission lines 1 and 2, and a breaker 7 is connected one of the connecting lines that link double-main buses 5. The double main bus is are connected by the one connecting line in which breaker 7 is installed and another connecting line in which breaker 7 is not installed.

Figure 2:
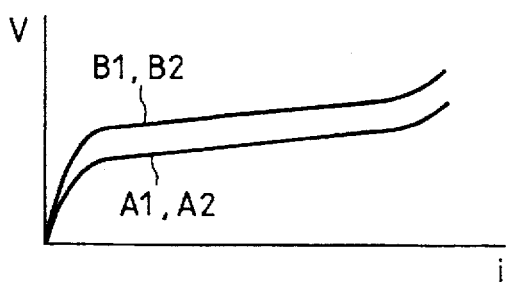
FIG. 2 shows voltage-current characteristics of an arrester according to the present invention and standard arrester.

The connecting line in which a breaker 7 is not installed is connected to transformer 3 through still another breaker 7 and transformer connecting bus 6. Standard arrester A1 that has a discharge voltage that satisfies the standard is installed in the vicinity of the bushing of each line entrance 4, and a standard arrester A2 is installed in transformer connecting bus 6. Arrester B1 is installed on the side of the lines of breaker 7 of each line entrance 4, and arrester B2 is installed at four places to double main bus 5, as shown in FIG. 1. When analyzing lightning surge at the substation, the maximum value of the overvoltage of each part often becomes 20 to 60% higher than the discharge voltage of the arrester. This range depends on the construction. The restricted voltages of arresters B1, B2 are made 10 to 30% higher than those of arresters A1, A2, as shown in the voltage-current characteristics of FIG. 2. Zinc oxide elements manufactured using a new composition that can be used in a high electric field of 1.5 times or more than those of standard arresters A1, A2 are used for arresters B1, B2. For example, the composition comprises ZnO as a main component, and 0.01% by mol of $Al(NO_3).9H_2O$, 1% by mol of $LiCO_2$, 10–15% by mols of $SiO_2$ and 2% by mol of $Sb_2O_3$ as additives. The ingredients of the composition are mixed, molded and calcined to obtain a zinc oxide element having a discharge voltage at V1mA which is about 1.5 higher than that of elements used in standard arresters A1, A2.

While in the zinc oxide element for the general and standard arrester, the discharge voltage is almost 200V/mm, in the high electric field zinc oxide element, the discharge voltage is more than 300V/mm. Therefore, the total length of arresters B1 and B2 can be made one per 1.5 or less than the total length of arresters A1, A2. Because the discharge voltage of the arresters B1, B2 is made 10 to 30% higher than standard arresters A1, A2, arresters B1 and B2 absorb less energy than do arresters A1, A2 in a short time overvoltage, etc.

Figure 3:
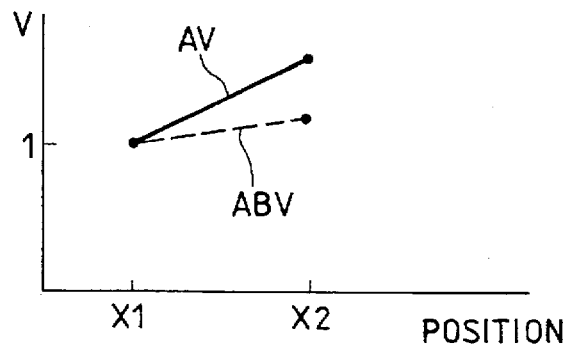
FIG. 3 shows an example of the examination result of insulation resistance against lightning surge of the present invention.
Figure 4:
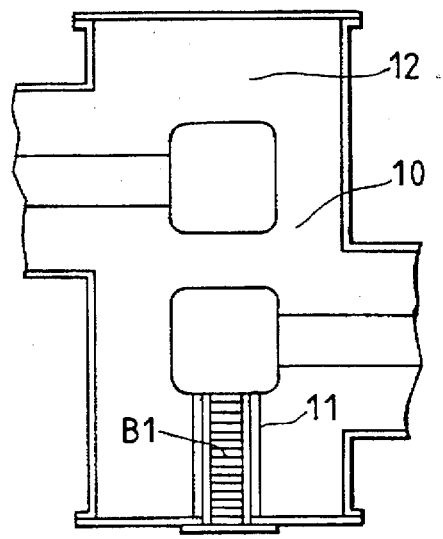
FIG. 4 shows an example wherein an arrester used in the present invention is installed in a disconnector of the GIS.

FIG. 3 shows the effect on lightning surge in example 1, which is a result obtained by investigating insulation resistance in case of opening the contacts of breaker 7 at the line entrance. There are shown overvoltage distribution AV in a case where only standard arrester A1 is installed and overvoltage distribution ABV in a case where arrester A1 and arrester B1 are installed. In this example, the maximum of the overvoltage in overvoltage distribution AV occurs at X2 of breaker 7 of the line entrance of the open pole shown in FIG. 1, which is 60% higher than the voltage at X1 of arresters A1. The maximum overvoltage in overvoltage distribution ABV is suppressed by about 30% of the maximum overvoltage in overvoltage distribution AV. The effect of installation of arrester B1 is apparent, and well balanced insulation coordination can be achieved. Because the total length of arresters B1, B2 can be made one per 1.5 times or less than the total length of arresters A1, A2, less energy is absorbed by the arresters B1, B2 than by arresters A1, A2, so that small sized arresters B1, B2 can be utilized. For example, FIG. 4 shows an arrester B1 in disconnector 10 of the GIS. Arrester B1 comprised of zinc oxide elements for high electric field is enveloped in fixed insulation tube 11 of disconnector 10.

Since the length of arrester B1 is shorter than conventional arresters, it can be installed in the disconnector, as shown in FIG. 4. Because the length of arrester B1 is shorter than the length of conventional arresters, series capacitance becomes equal or larger. The influence of the grounded tank becomes small, and stray capacitance becomes small. It has the advantage that the voltage share on each of the zinc oxide elements can be equalized. If an airtight condition with the outside can be secured by insulation tube 11, in case a malfunction arises in arrester B1, the arrester B1 can be removed, checked and recovered. Arrester B1 also can be installed at upper part 12. It is possible with the present invention to provide substations of well balanced insulation coordination and high reliability.

EXAMPLE 2

Figure 5:
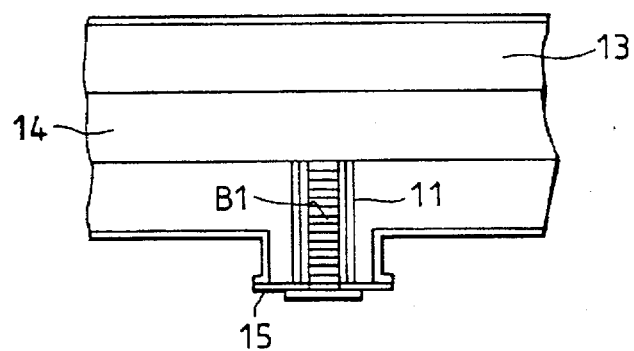
FIG. 5 shows an example wherein an arrester of the present invention is installed in a gas insulated bus.
Figure 6:
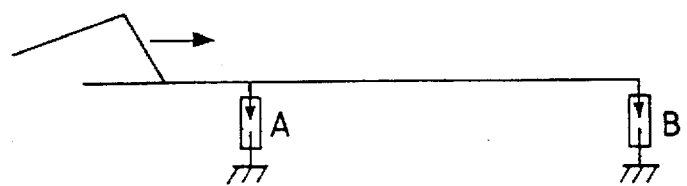
FIG. 6 shows a single wire connection of a substation using a conventional gas insulated switchgear apparatus.

FIG. 5 shows art ester B1 installed in a gas insulated bus 13 of the GIS. In this example, arrester B1 is installed between adapters 15 installed in the tank and conductor 14. Compared with the case of FIG. 4, the flexibility of the installation position is large.

EXAMPLE 3

While in examples 1 and 2, insulation tube 11 was provided, it can be omitted. In this case, while self-recovery of the insulation tube 11 is difficult, the expense of the overvoltage protection system becomes less.

EXAMPLE 4

FIG. 4, FIG. 5 and example 3 show an example of arrester B1, but this is also applicable to arrester B2 which is installed to main bus line 5.

EXAMPLE 5

The installation metal fittings of arresters B1, B2 using the zinc oxide elements for high electric field and the standard arresters A1, A2 are formed in different sizes and shapes. As a result, the fittings can be fixed to the GIS without mistakes or errors.

According to this invention, arresters having a discharge voltage of 10–30% higher than that of a standard arrester can be manufactured. Since it is possible to install the arresters near the open ends of the GIS, a substation with high reliability of balanced insulation can be provided.

What is claimed is:

1. A substation comprising standard arresters satisfying the standard discharge voltage installed near a bushing of a power transmission line entrance and at a connecting bus of a transformer, and a high voltage arrester having a discharge voltage of 10 to 30% higher than a standard arrester installed near a power transmission line entrance part of a breaker wherein said high voltage arrester comprises ZnO as a main component and 0.01% by mol of $Al(NO_3)9H_2O$, 1% by mol of $LiCO_2$, 10 to 15% by mol of $SiO_2$ and 2% by mol of $Sb_2O_3$, and wherein a discharge voltage of zinc oxide elements used in said standard arresters is about 200 V/mm at 1 mA and a discharge voltage of zinc oxide elements used in said high voltage arrester is about 300 V/mm or more.

2. The substation according to claim 1, wherein said high voltage arrester is installed in a gas circuit breaker.

3. The substation according to claim 1, wherein said high voltage arrester is installed in a gas insulated bus.

4. The substation according to claim 1, wherein said high voltage arrester is installed in an air tight condition in an insulation cylinder.

5. The substation according to claim 1, wherein a size and shape of said standard arresters are different from those of said high voltage arresters.

6. A substation according to claim 1 further including a gas insulated switchgear and having a plurality of arresters of zinc oxide elements installed at different places of said gas insulated switchgear, part of said zinc oxide elements having a different composition from that of the rest of said zinc oxide elements.

7. A substation according to claim 1 further including a plurality of high voltage arresters installed to a double main bus.

* * * * *